US010674458B2

(12) United States Patent
Bagheri et al.

(10) Patent No.: US 10,674,458 B2
(45) Date of Patent: Jun. 2, 2020

(54) METHOD AND APPARATUS FOR DETERMINING TRANSMIT POWER SHARING

(71) Applicant: Lenovo (Singapore) Pte. Ltd., New Tech Park (SG)

(72) Inventors: Hossein Bagheri, Urbana, IL (US); Ebrahim MolavianJazi, Lincolnwood, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 16/379,797

(22) Filed: Apr. 10, 2019

(65) Prior Publication Data

US 2019/0320396 A1 Oct. 17, 2019

Related U.S. Application Data

(60) Provisional application No. 62/657,784, filed on Apr. 14, 2018.

(51) Int. Cl.
*H04W 52/34* (2009.01)
*H04W 72/12* (2009.01)
*H04W 84/04* (2009.01)

(52) U.S. Cl.
CPC ....... *H04W 52/34* (2013.01); *H04W 72/1289* (2013.01); *H04W 84/042* (2013.01)

(58) Field of Classification Search
CPC .......... H04W 52/146; H04W 72/1289; H04W 52/34; H04W 84/042; H04W 16/14; H04W 52/04; H04W 52/38
See application file for complete search history.

(56) References Cited

U.S. PATENT DOCUMENTS

2019/0141767 A1* 5/2019 Wang .................. H04L 27/2656

OTHER PUBLICATIONS

3GPP TS 38.213, "NR, Physical layer procedures for control", Rel. 15, v15.1.0, 3rd Generation Partnership Project, Valbonne, France, Mar. 2018.

(Continued)

*Primary Examiner* — Keith Ferguson
(74) *Attorney, Agent, or Firm* — Loppnow & Chapa; Matthew C. Loppnow

(57) ABSTRACT

LTE UL scheduling information for at least one LTE UL transmission occasion and NR UL scheduling information for an NR UL transmission occasion can be received. An LTE UL transmit power of an LTE UL transmission occasion of the at least one LTE UL transmission occasion and a first NR UL transmit power of the NR UL transmission occasion can be determined. If the LTE UL transmission occasion of the at least one LTE UL transmission occasion overlaps in time with the NR UL transmission occasion, a determination can be made as to whether dynamic power sharing between LTE and NR is applicable for the NR UL transmission occasion and a second NR UL transmit power can be determined. The second NR UL transmit power can be determined such that the LTE UL transmit power summed with the second NR UL transmit power is not higher than a threshold.

20 Claims, 6 Drawing Sheets

(56) References Cited

OTHER PUBLICATIONS

LG Electronics, R1-1800392, "Discussion on dynamic power sharing with sTTI for DC", 3GPP TSG RAN WG1 NR AH1801, Vancouver, Canada, Jan. 22-26, 2018.
LG Electronics, R1-1802224, "Remaining issues on power sharing for EN-DC", 3GPP TSG RAN WG1 Meeting #92, Athens, Greece, Feb. 26-Mar. 2, 2018.
Samsung, R1-1801980, "Corrections on UL Power Control Operation for CA", available from 3GPP as R1-1801996, 3GPP TSG RAN WG1 #92, Athens, Greece, Feb. 26-Mar. 2, 2018.
LG Electronics, R1-1804565, "Remaining issues on power sharing between LTE and NR", 3GPP TSG RAN WG1 Meeting #92bis, Sanya, China, Apr. 16-20, 2018.
Samsung, R1-1804386, "Corrections on UL Power Control Operation for EN-DC", 3GPP TSG RAN WG1 #92bis, Sanya, China, Apr. 16-20, 2018.
Intel Corporation, R1-1800343, "Remaining aspects on power sharing between LTE and NR", 3GPP TSG-RAN NG1 Meeting #AH 1801, Vancouver, Canada, Jan. 22-26, 2018.
Ericsson, R1-1805203, "Remaining issues for CA and power sharing", 3GPP TSG-RAN WG1#92bis, Sanya, P.R. China, Apr. 16-20, 2018.
Nokia, Nokia Shanghai Bell, R1-1805143, "Power control for EN-DC option 4", 3GPP TSG RAN WG1 Meeting #92 bis, Sanya, P.R. China, Apr. 16-20, 2018.
Ericsson, R1-1721313, "RAN1 decisions for WI Shortened TTI and processing time for LTE (LTE_sTTIandPT)—per topic", 3GPP TSG RAN WG1 Meeting #91, Reno, USA, Dec. 4, 2017.
Weinmiller, PCT International Search Report, International Application No. PCT/IB2019/052978, European Patent Office, Rijswijk, NL, dated Jul. 10, 2019.
China Telecom: "Discussion on Power Sharing for NR-LTE co-existence", 3GPP Draft; R1-1717739 Discussion on Power Sharing for NR-LTE Co-Existence, 3rd Generation Partnership Project (3GPP), Mobile Competence Centre ; 650, Route Des Lucio Les ; F-06921 Sophia-Antipolis CED , vol. RAN WG1, No. Prague, CZ; Oct. 9, 2017-Oct. 13, 2017, Oct. 8, 2017 (Oct. 8, 2017).
Interdigital et al: "Power Sharing Mechanisms with LTE-NR DC and NR" , 3GPP Draft; R1-1714118 (R15 NR WI AI 6171 Power Sharing), 3rd Generation Partnership Project (3GPP), Mobile Competence Centre; 650, Route Des Lucioles ; F-06921 Sophia-Antipolis Cedex; France vol. RAN WG1, No. Prague, Czech Republic; Aug. 21, 2017-Aug. 25, 2017, Aug. 20, 2017 (Aug. 20, 2017).
LG Electronics: "Remaining details on UL sharing between LTE and NR", 3GPP Draft; R1-1710354 LTE-NR Coexistence UL, 3rd Generation Partnership Project (3GPP), Mobile Competence Centre; 650, Route Des Lucioles ; F-06921 Sophia-Antipolis Cedex; France, vol. RAN WG1, No. Qingdao, P.R. China; Jun. 30, 2017 Jun. 17, 2017 (Jun. 17, 2017).

* cited by examiner

METHOD AND APPARATUS FOR DETERMINING TRANSMIT POWER SHARING

BACKGROUND

1. Field

The present disclosure is directed to a method and apparatus for determining transmit power sharing. More particularly, the present disclosure is directed to determining transmit power sharing for Long-Term Evolution (LTE) and New Radio (NR) transmissions.

2. Introduction

Presently, wireless communication devices, such as User Equipment (UE), communicate with other communication devices using wireless signals. In current Third Generation Partnership Project (3GPP) LTE systems, time-frequency resources are divided into subframes where each 1 ms subframe comprises two 0.5 ms slots and each slot with normal Cyclic Prefix (CP) duration comprises 7 Single-Carrier Frequency-Division Multiple Access (SC-FDMA) symbols in the time domain in Uplink (UL) and 7 Orthogonal Frequency-Division Multiplexing (OFDM) symbols in the time domain in Downlink (DL). In the frequency domain, resources within a slot are divided into Physical Resource Blocks (PRBs), where each PRB spans 12 contiguous subcarriers.

Usually resources are assigned using a 1 ms minimum Transmission Time Interval (TTI) when data is available, referred to as dynamic scheduling. Within each scheduled TTI, in UL, the UE transmits data over a Physical Uplink Shared Channel (PUSCH) in PRB-pairs indicated by an UL grant from the network to the UE, where the UL grant schedules the data transmission. In DL, an enhanced NodeB (eNB) transmits data over a Physical Downlink Shared Channel (PDSCH) in PRB-pairs indicated by a DL grant/assignment. The UL grant and/or DL assignment information is provided to the UE in a control channel, referred to as a (enhanced) Physical Downlink Control Channel PDCCH or EPDCCH. The (E)PDCCH channel carries the control information about the data being transmitted on the current subframe and the information about the resources that UE needs to use for the uplink data.

As mentioned above, there are two types of downlink physical layer control signaling for the purpose of dynamic scheduling. The first type of downlink physical layer control signaling is PDCCH, where the control signaling from an eNodeB is received by a UE, for example, in the first, first two, first three, or first four symbols of a subframe, where these symbols are referred to as control symbols. The remaining symbols following the control symbols in the subframe are typically used for receiving user data. User data is received by the UE on the PDSCH and in select Resource Blocks (RBs) of the PDSCH occupying either in the entire carrier bandwidth or a portion of it.

The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the Control Channel Elements (CCEs) corresponding to a PDCCH candidate of the search space $S_k^{(L)}$ are given by a formula using parameters including the total number of CCEs in the control region of subframe derived from a reduction of Physical Control Format Indicator Channel (PCFICH) and Physical Hybrid Automatic Repeat Request (Hybrid-ARQ) Indicator Channel (PHICH) resources, the aggregation level, the number of PDCCH candidates to monitor in the given search space, and the slot number within the radio frame. A physical control channel is transmitted on an aggregation of one or several consecutive CCEs, where a CCE corresponds to 9 Resource Element (RE) groups. For example, the number of CCEs in a PDCCH is called its CCE aggregation level. Each CCE is equivalent to 36 REs. One CCE is the minimum PDCCH allocation unit. The number of resource-element groups not assigned to Physical Control Format Indicator Channel (PCFICH) or Physical Hybrid-Automatic Repeat Request (ARQ) Indicator Channel (PHICH) is $N_{REG}$. The CCEs available in the system are numbered from 0 to $N_{CCE}-1$, where $N_{CCE}=\lfloor N_{REG}/9 \rfloor$. A PDCCH consisting of n consecutive CCEs may only start on a CCE fulfilling i mod n=0, where i is the CCE number.

The second type of downlink physical layer control signaling is EPDCCH. For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of a set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission. For each serving cell, the subframes in which the UE monitors EPDCCH UE-specific search spaces are configured by higher layers.

A UE shall monitor a set of (E)PDCCH candidates for control information, where monitoring implies attempting to decode each of the (E)PDCCH decoding candidates in the set according to the monitored Downlink Control Information (DCI) formats. The set of (E)PDCCH candidates to monitor are defined in terms of (E)PDCCH search spaces.

To reduce latency of communication in LTE, various solutions are being studied. For example, an approach envisioned for future LTE systems is to use shorter minimum TTIs (sTTIs), such as shorter than 1 ms, in UL/DL. Using a sTTI allows the UE to send and receive data using reduced latency when compared to current LTE systems. In addition, acknowledging each or a group containing few sTTI(s) leading to faster acknowledging data, compared to using 1 ms TTI, can help in some applications such as Transmission Control Protocol (TCP) during slow-start phase for users in good channel conditions. For example, in the TCP slow-start phase for DL communication, the network-UE link capacity for a user in good channel conditions can support more data, but the network sends a smaller amount of data because the network is waiting to receive the acknowledgment for the previously sent data due to the TCP slow-start phase. Therefore, faster acknowledgments, such as resulting from using shorter TTI length, would enable the network to better utilize the available network-UE link capacity.

For example, scheduling UE transmission over a sTTI length of 0.5 ms, such as a PUSCH scheduled using a PRB spanning a 0.5 ms in a 1 ms subframe, or scheduling UE transmission over a sTTI length of ~140 us, such as a PUSCH scheduled using a shortened PRB spanning 2 SC-FDMA symbols within a slot in a subframe, would not only reduce time taken to start/finish transmitting a data packet, but also potentially reduce the round trip time for possible HARQ retransmissions related to that data packet.

The PDCCH channel carries the control information about the data being transmitted on the current subframe and the information about the resources which UE need to use for the uplink data. That means it is mandatory for the UE to decode it successfully if it wants to send some data or receive something. For reduced latency a shortened PDCCH (sPDCCH) is defined to play a similar role in a sTTI or a group of sTTIs. For PDCCH, allocation of resources happens in terms of CCE (Control Channel Elements) which is equivalent to 36 REs. One CCE is the minimum PDCCH allocation unit. As the sTTI length becomes smaller, the control overhead increases, which in turn increases the complexity and hence the processing delay, which could negatively impact the latency reduction offered by low-latency operation.

Packet data latency is one of the performance metrics that vendors, operators and also end-users regularly measure, such as via speed test applications. In the Third Generation Partnership Project (3GPP) community, much effort has been put into increasing data rates by introducing features like carrier aggregation of up to 32 carriers, 8×8 Multiple Input Multiple Output (MIMO), or 256 Quadrature Amplitude Modulation (QAM). However, to achieve the highest experienced rates, it is necessary to have both a high throughput and a low latency. Especially for smaller files, latency has an important impact.

In an effort to address this in 3GPP, latency reduction techniques have been studied. It was found that reducing the Transmit Time Interval (TTI) length and the processing time, such as time between allocation/scheduling and the corresponding transmission/feedback, can significantly reduce the user plane latency and improve Transmission Control Protocol (TCP) throughput. Furthermore, specifying solutions with smaller latency could, for example, allow User Equipments (UEs) to reduce the L2 memory needed to buffer data in flight, allow for more robustness due to the ability to re-transmit more often within a certain delay bound, directly increase perceived quality of experience for today's delay-sensitive real-time applications like gaming, voice telephony and/or video conferencing, and allow addressing new future use cases, such as critical Machine-Type Communication (MTC) applications, in a better way.

Since 3GPP LTE Release (Rel)-15 it is possible to configure a UE with a Short Processing Time (SPT) and a shorter TTI (sTTI) length. If SPT for 1 ms TTI length is configured, the minimum timing from Uplink (UL) grant transmission to UL Physical Uplink Shared Channel (PUSCH) transmission, and the timing from Downlink (DL) Physical Downlink Shared Channel (PDSCH) transmission to Hybrid-Automatic Repeat Request (HARQ) feedback transmission is 3 ms instead of 4 ms used in legacy LTE. sTTI provides support for TTI lengths shorter than 1 ms for a Downlink Shared Channel (DL-SCH) and an Uplink Shared Channel (UL-SCH) instead of the fixed 1 ms TTI in legacy LTE. To support the short TTI, the associated control channels, Short Physical Downlink Control Channel (SPD-CCH) containing Downlink Control Information (DCI) for short TTI operation, referred to as sDCI, and Short Physical Uplink Control Channel (SPUCCH) are also transmitted with duration shorter than 1 ms. Over the physical layer, DL and UL transmissions use either slots or subslots when short TTI is configured. A subslot is defined to be of either 2 OFDM/SC-FDMA symbol or 3 OFDM/SC-FDMA symbol duration. When short TTI is configured, extended cyclic prefix is not supported. For sTTI, Uplink ACK/NAKs in response to downlink (re)transmissions are sent on SPUCCH or (sub)slot-PUSCH.

Uplink asynchronous adaptive Hybrid Automatic Repeat Request (HARQ) is used for HARQ processes scheduled with (sub)slot based PUSCH, which can also be referred to as sPUSCH, and HARQ processes scheduled with SPT. Further detailed information on SPT and sTTI can be found in related 3GPP specifications such as Technical Specification (TS)36.321, TS36.300, and TS36.213.

According to 3GPP agreements, a UE can be dynamically, such as with a subframe to subframe granularity, scheduled with legacy TTI unicast PDSCH and/or unicast sPDSCH. Also, for sPUSCH, a UE can be dynamically, such as with a subframe to subframe granularity, scheduled with PUSCH and/or sPUSCH. Additionally, for sPUSCH, only the Transmit Power Control (TPC) from sDCI is considered. Furthermore, for PUSCH, only the TPC from DCI is considered.

Fifth Generation (5G) NR provides a new architecture for next generation of cellular communications. A main deployment scenario for 5G NR, particularly for initial deployments after specification adoption, is expected to be the Non-Standalone (NSA) scenario, where 5G NR co-exists with 4G/5G LTE. For such an LTE-NR coexistence, also known as Evolved Universal Terrestrial Radio Access (EUTRA)-NR Dual Connectivity (EN-DC) or multi-radio dual-connectivity (MR-DC), the UE communicates to both a 4G/5G LTE base station, such as an eNB, and an NR base station (gNB). Different architecture options have been considered for EN-DC operation depending upon the choice of the core network such as the LTE Evolved Packet Core (EPC) or the 5G Core Network (5G-CN), and the choice of anchor, such as LTE anchor for EN-DC or NR anchor, for that which can be considered as NR-EUTRA dual-connectivity or NE-DC.

Uplink power sharing between LTE and NR is a key element for UE behavior in the NSA operation. Whenever the LTE and NR uplink transmissions overlap in time, there is a chance that the total sum of the individual powers of the LTE modem and the NR modem exceed the configured/specified maximum output power for the UE, which can lead to a power-limited scenario. Unfortunately, current systems do not provide adequate power sharing for dual connectivity. For example, current systems do not provide power sharing for LTE Semi-Persistent Scheduling (SPS) with NR transmission. Current systems also do not provide dual connectivity for LTE sTTI.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments can provide a method and apparatus for determining transmit power sharing, such as determining transmit power sharing for LTE and NR transmissions. According to a possible embodiment, LTE UL scheduling information for at least one LTE UL transmission occasion can be received. NR UL scheduling information for an NR UL transmission occasion can be received. An LTE UL transmit power of an LTE UL transmission occasion of the at least one LTE UL transmission occasion can be determined. A first NR UL transmit power of the NR UL transmission occasion can be determined. A determination can be made as to whether the LTE UL transmission occasion of the at least one LTE UL transmission occasion overlaps in time with the NR UL transmission occasion. If the LTE UL transmission occasion of the at least one LTE UL transmission occasion overlaps in time with the NR UL transmission occasion, a determination can be made as to whether dynamic power sharing between LTE and NR is applicable for the NR UL transmission occasion and a second NR UL transmit power can be determined. The second NR UL transmit power can be determined based on there being an LTE UL transmission in the LTE UL transmission occasion, based on dynamic power sharing between LTE and NR being applicable for the NR UL transmission occasion, and based on the LTE UL transmit power summed with the first NR UL transmit power being higher than a threshold. The second NR UL transmit power can be determined such that the LTE UL transmit power summed with the second NR UL transmit power is not higher than the threshold. The NR UL transmission can be transmitted using the second NR transmit power without transmitting at least a portion of the LTE UL transmission.

At least some embodiments can provide for determining a second NR UL transmit power based on there being an LTE UL transmission in the LTE UL transmission occasion and transmitting the NR UL transmission using the second NR transmit power while skipping the LTE UL transmission. At least some embodiments can also provide for dynamic power sharing for LTE SPS with NR transmissions. At least some embodiments can also provide for using EN-DC along with LTE sTTI. At least some embodiments can also provide for determining NR UL transmit power when LTE SPS is used.

Figure 1:
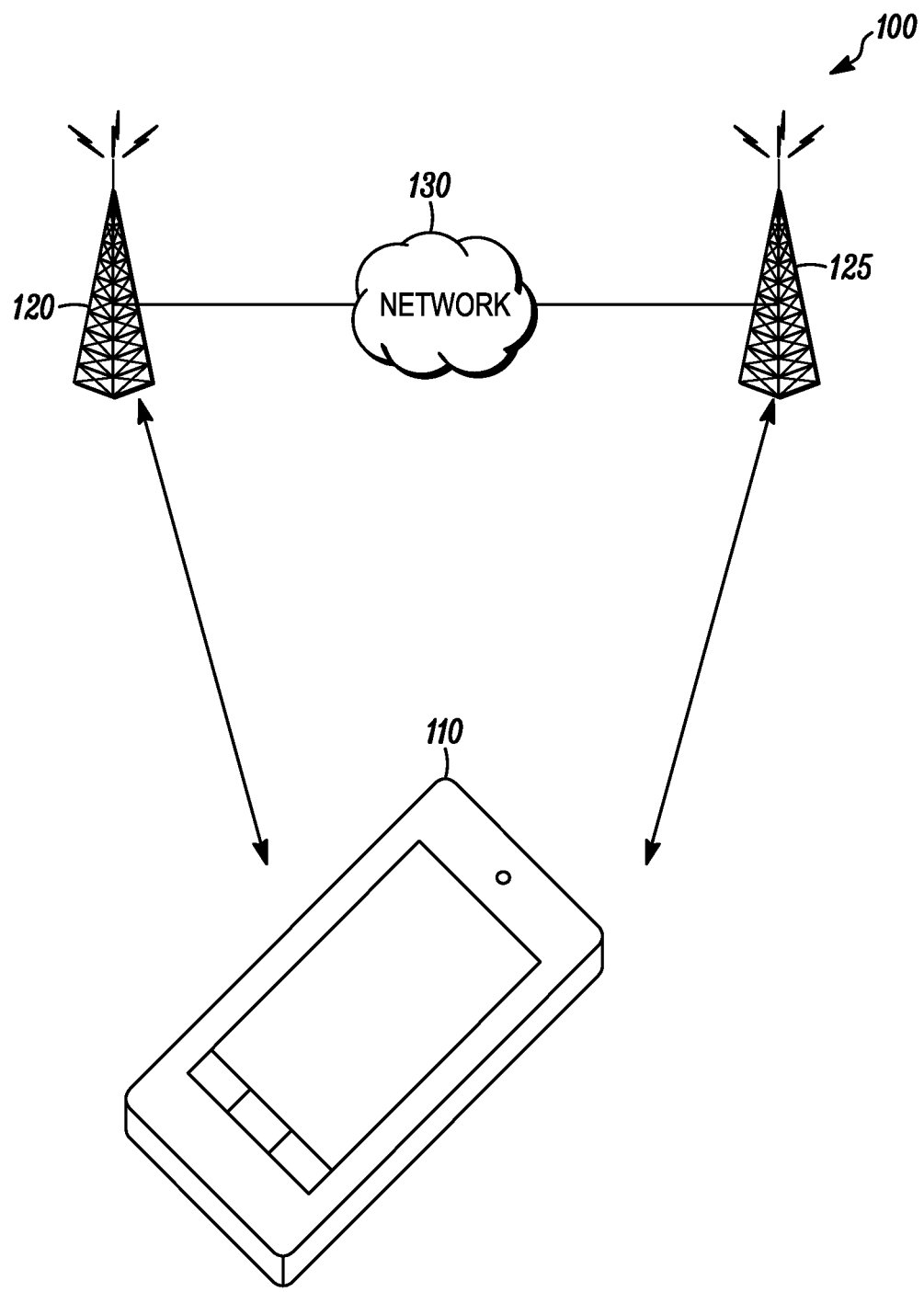
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The at least one network entity 120 and/or 125 can be a wireless wide area network base station, can be a NodeB, can be an enhanced NodeB (eNB), can be a New Radio (NR) NodeB (gNB), such as a 5G NodeB, can be an unlicensed network base station, can be an access point, can be a base station controller, can be a network controller, can be a Transmission/Reception Points (TRP), can be different types of network entities from each other, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a LTE network, a NR network, a 3rd Generation Partnership Project (3GPP)-based network, a satellite communications network, a high altitude platform network, the Internet, and/or other communications networks.

In operation, the UE 110 can communicate with the network 130 via at least one network entity 120. For example, the UE can send and receive control signals on a control channel and user data signals on a data channel.

To reduce the control signal overhead, a few general approaches are possible. One approach can include scheduling multiple sTTIs via a single grant, such as sent via an sPDCCH or (E)PDCCH command, which can be referred to as multi-sTTI scheduling. Another approach can include sending the control information in a hierarchical manner, such as using more than one step. For instance, a first step, which can be referred also to as slow-DCI, can provide a subset of control information common to a set of sTTIs at a first time instance and a second step, which can be referred also to as fast-DCI, can provide complementary control information pertinent to each sTTI at a second time instance. The first step can contain resource/search space information of the second step control information. Another approach can include sending the control information in each scheduled sTTI, but with some DCI bit field reduction compared to the DCIs used for legacy 1 ms-TTI. For example, for 2 or 3-symbol sTTI, the Resource Block Group (RBG) size can be larger, such as six times larger, than the RBG size used for a legacy 1 ms-TTI.

Figure 2:
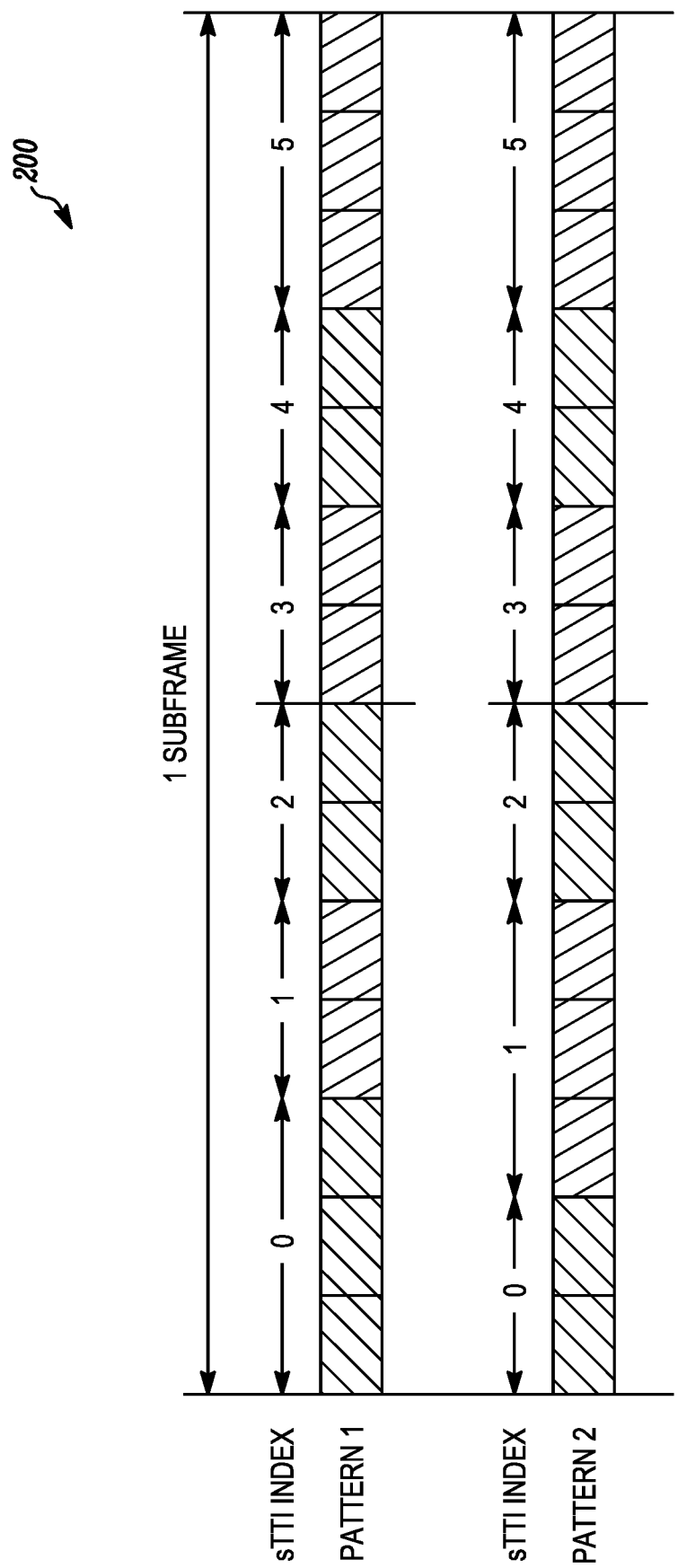
FIG. 2 is an example illustration of DL sTTI patterns according to a possible embodiment.

FIG. 2 is an example illustration 200 of DL sTTI patterns according to a possible embodiment. For 2-symbol DL TTI, the sTTI patterns, Pattern 1 and Pattern 2, in OFDM symbols per subframe in the illustration 200 are supported for 2 and 3 OFDM symbol-sTTI configuration. In this case, each pattern in a subframe can include 6 sTTIs. The UE 110 can determine which DL sTTI pattern to use based on the Control Format Indicator (CFI) value indicated by Physical Control Format Indicator Channel (PCFICH), such as based on the PDCCH length in number of OFDM symbols, in case of a self-carrier scheduled component carrier, and via Radio Resource Control (RRC) signaling for the case of cross-carrier scheduled component carrier. Cell Specific Reference Signal (CRS)-based and Demodulation Reference Signal (DMRS)-based sPDCCHs can be supported.

LTE-Ultra Reliable Low Latency Communication (URLLC) is being specified in 3GPP to enable very low-latency and highly reliable communication, such as with a target latency of 1 ms and a target reliability of $10^-5$. For some of the target latencies, the UE may not rely on HARQ retransmissions, as the existing minimum processing timeline for 2/3 OFDM Symbol (OS) sTTI can make a HARQ retransmission possible at least in 8 sTTIs after the PUSCH transmission, which could exceed the 1 ms latency bound. Each 1 ms subframe can include of 6 2/3OS sTTIs. UL SPS with repetitions can be used to achieve the targets. For instance, a PUSCH can be repeated in a configured number, such as 2, of consecutive sTTIs starting with a sTTI, which can be a SPS occasion.

With SPS, instead of scheduling a single UL or DL transmission, a transmission pattern, also called SPS occasions, can be defined. This can reduce the scheduling assignment overhead, and can enable data communication with lower latency as there may be no need to obtain/generate scheduling assignment information for each transmission.

For sTTI-based SPS operation, the TPC in LTE DCI format 3/3A can be considered in the power control of sPUCCH corresponding to SPS-sPDSCH/SPS-sPUSCH in SPS operation. The power control loop for SPS may not be impacted by the UL/DL sDCI. The power control loop for non-SPS may not be impacted by DCI format 3/3A. Also, the TPC-index for DCI format 3/3A can be separately configured by the RRC layer as part of the SPS configuration, such as a TPC-PDCCH-config Information Element (IE), for sTTI and TTI. Additionally, the processing timing of DCI format 3/3A in sTTI operation can be according to legacy n+4 subframe processing timeline.

As discussed above, 5G NR provides a new architecture for next generation of cellular communications. A main deployment scenario for 5G NR, particularly for initial deployments after specification adoption, can be the Non-Standalone (NSA) scenario, where 5G NR co-exists with 4G/5G LTE. For such an LTE-NR coexistence, also known as EN-DC or NE-DC, the UE can communicate with both a 4G/5G LTE base station, such as an eNB, and an NR base station, such as a gNB. Different architecture options can be used for EN-DC operation depending upon the choice of the core network such as the LTE Evolved Packet Core (EPC) or the 5G Core Network (5G-CN), and the choice of anchor, such as LTE anchor or NR anchor. For example, per 3GPP terminology, architecture Option 3 can capture the case of EN-DC with LTE as the anchor, such as where the UE can be configured with a Master Cell Group (MCG) using LTE (EUTRA) radio access and with a Secondary Cell Group (SCG) using NR radio access. Another example is architecture Option 4 that can capture the case of NE-DC with NR as the anchor, such as where the UE can be configured with an MCG using NR radio access and with an SCG using LTE radio access. At least some embodiments may describe EN-DC, but at least some aspects of such embodiments may be equally applicable to NE-DC and/or MR-DC.

As discussed above, uplink power sharing between LTE and NR can be used for UE behavior in the NSA operation. Whenever the LTE and NR uplink transmissions overlap in time, there can be a chance that the total sum of the individual powers of the LTE modem and the NR modem exceed the configured/specified maximum output power for the UE, such as Pcmax or P_{EN-DC, total} from TS 38.101 or a corresponding maximum power limit for NE-DC operation, which can lead to a power-limited scenario. Therefore, depending on the power settings for LTE and NR as well as the UE capability, several modes of operation may be used for EN-DC power sharing, such as semi-static power sharing, dynamic power sharing, like Dual Uplink Operation (DUO), and Single-Uplink Operation (SUO). A possible component in deciding on the EN-DC/NE-DC power sharing mode can be the length of TTI and the length of processing time, such as how fast the UE can make an uplink transmission once the UE receives the corresponding uplink/downlink grant.

3GPP specification TS 38.213 v15.1.0 captures EN-DC power sharing for architecture Option 3 when LTE is the anchor. According to a possible implementation, the UE can be configured with a maximum power P_LTE for uplink transmissions on the MCG using LTE radio access and a maximum power P_NR for uplink transmissions on the SCG using NR radio access. Furthermore, a maximum aggregate power limit P_{EN-DC, total} can also be configured to the UE for the EN-DC operation, at least for Frequency Range 1 (FR1), such as below 6 GHz. Depending upon the values of these configured power limits, several modes of operation can be identified.

According to one mode, if P_LTE+P_NR<=P_{EN-DC, total}, the UE can follow a semi-static power sharing. For example, LTE and NR can have certain reserved/guaranteed power limits, and individual power limits for LTE and NR can be kept at rather low levels to avoid a power-limited situation for overlapping uplink transmissions of LTE and NR in the first place. Therefore, the LTE modem and the NR modem may not need to talk to each other. No power borrowing may need occur and the processing times for LTE and NR may not impact the EN-DC operation. Therefore, this mode may not be captured in the specification.

According to another mode, if P_LTE+P_NR>P_{EN-DC, total}, there can be a chance that overlapping uplink transmissions of LTE and NR can cause a power-limited situation for the UE. For example, P_LTE can be configured up to Pcmax for the LTE cell group, and P_NR can be configured up to Pcmax for the NR cell group. In such a case, two other modes can be considered.

In a first other mode, if the UE indicates, such as via higher layer signaling to the network, a capability for dynamic power sharing, such as DUO, and if the UE faces a power-limited situation in overlapping uplink transmissions to LTE and NR, then the UE can keep the power setting for the LTE, which is the anchor in architecture Option 3, and can scale down the power for NR or drop the NR transmission in the overlapping, power-limited portion. For such a dynamic power sharing mode, the LTE and NR modems can talk to each other to perform power borrowing. For example, power level in one modem, such as the NR modem, can be re-adjusted based on how much power is used in the other modem, such as the LTE modem. An underlying assumption for this dynamic power sharing capability can be that NR processing time can be at least at the same speed or possibly faster than the LTE processing time.

In the second other mode, if the UE does not indicate a capability for dynamic power sharing, the UE can expect the network to prevent a power-limited situation by avoiding any overlap between LTE and NR transmissions via configuring the transmission instances, such as via Time Division Multiplexing (TDM) between LTE and NR. For that, a new Time Division Duplexing (TDD) subframe assignment can be defined for LTE, even if LTE is originally operating with Frequency Division Duplexing (FDD), such that LTE may only transmit in certain designated UL subframes, during which the UE may not attempt any NR transmissions. In other subframes, however, no LTE transmission may occur and only NR transmissions may be allowed. This mode of operation can be called the SUO.

Regarding the EN-DC power sharing for EN-DC Architecture Option 3, such as with LTE as the anchor, and when the LTE is configured for sTTI and/or short processing time, several options are possible. In one option, as support for dynamic power sharing depends on the TTI length and the UE processing time, one approach can be to define separate UE capability indication for dynamic power sharing if the UE can support shortened TTI and processing time on the MCG. In particular, in order to transmit NR HARQ ACK/PUSCH considering P_cmax−P_LTE_2, it can be guaranteed that the time from grant to uplink transmission can be larger than T0+T1, where T0 can be defined as time to send LTE power to NR modem after decoding the grant, and T1 can be defined as the processing time of remaining NR processing after adjusting power. Since the time T0+T1 can be a different UE ability, it can be reported to network by UE capability. Accordingly, the new UE capability for dynamic power sharing between LTE sTTI and NR in dual connectivity can be defined, as whether the processing time is larger or smaller than 0.6 ms, 1 ms, 1.33 ms, 2 ms, and/or 4 ms. These values can be computed based on the assumption that the grant is on n sTTI and HARQ ACK/PUSCH is on n+K sTTI, where the possible K value can be 4, 6, 8 DL sTTI or 4, 6, 8 UL sTTI, so that following cases can be considered: 1 subframe TTI: 4 ms; UL/DL 1 slot TTI: 2 ms; UL/DL 2/3 OS TTI: 600 us, 1 ms, and/or 1.33 ms; UL 1 slot TTI, DL 2/3 OS TTI, HARQ timing: 600 us, 1 ms, and/or 1.33 ms; and UL 1 slot TTI, DL 2/3 OS TTI, PUSCH scheduling timing: 2 ms. Accordingly, if UE declares the above-mentioned capability for processing time, then dynamic power sharing between LTE sTTI and NR in dual connectivity can be applied to a UE. For example, NR can scale power when the total power exceeds UE maximum output power.

According to another option, if sTTI is configured for a UE, and if $\hat{P}_{LTE}+\hat{P}_{NR}>\hat{P}_{Total}^{EN-DC}$ is configured, even though the UE supports dynamic power sharing capability, such as with legacy TTI for LTE, it can be assumed that semi-static power sharing based Case-1 can be used. With Case 1, sTTI uplink transmissions can be allowed only in UL subframes by reference DL/UL configuration, such as a SUO. A slightly different variant of this option can use a new timing table to allow utilizing all downlink even with sTTI.

In yet another option, given realistic constraints on UE implementations, it can be sufficient to assume, at least for NR phase 1, such as NR Rel-15, that a UE configured for shortened TTI and processing time on the MCG may not be expected to be configured with $\hat{P}_{LTE}+\hat{P}_{NR}>\hat{P}_{Total}^{EN-DC}$. In particular, the minimum available time at the UE to determine the prioritized LTE transmission overlapping for power scaling/dropping on NR can occur for the maximum TA values together with the maximum misalignment values between Cell Groups (CGs). Then, for sTTI based operation, the processing time, including both DL HARQ and UL grant timing, can be reduced compared to the 1 ms TTI operation to achieve the latency reduction target. Therefore, the available time for a UE to obtain the transmission power of LTE, in the sTTI setting, under maximum TA conditions can be rather short, so the configuration of P_LTE+P_NR>P_cmax may not be allowed for a UE that is configured with DL/UL sTTI based operation for LTE. Such a configuration may limit the coverage.

Finally, according to another approach, separate maximum power usable for legacy TTI and short TTI can be configured to the UE. That is, another maximum power P_LTE_2 can be used for short TTI or reduced processing time transmission where P_LTE_2+P_NR<=P_cmax. In other words, the total power between short TTI or reduced processing time and NR transmission may not exceed UE maximum power.

Regarding EN-DC power sharing in Architecture Option 4 with NR as the anchor, which can be considered NE-DC power sharing, the power sharing technique is not specified by 3GPP. Similar UE behavior can be specified for the Architecture Option 4 with NR as the anchor as those currently specified and mentioned above for Architecture Option 3 with LTE as the anchor, such as EN-DC, with the exception that LTE and NR can be flipped in all statements. For example, for the case of dynamic power sharing, the power setting for NR, which can be the anchor for Architecture Option 4, such as NE-DC, can be kept untouched and, if necessary, the power setting for LTE can be modified. The dynamic power sharing capability for Architecture Option 4, such as NE-DC, can be defined differently from that for Architecture Option 3, such as EN-DC. However, details have previously not been available regarding the impact of processing time for LTE and/or NR in EN-DC power sharing operation for Architecture Option 4, such as NE-DC.

Some embodiments can provide various approaches to enable power sharing between NR and LTE when short-TTI and/or shortened processing time is/are configured for LTE. At least some of the embodiments can apply generally to UL transmissions. UL transmissions can include PUSCH, PUCCH, SRS, PRACH, and/or other UL transmissions.

In case of a power limited UE, the NR transmission power can be adjusted based on the knowledge of concurrent LTE transmission. For the cases that the processing timeline corresponding to LTE transmission is shorter than the processing timeline corresponding to NR transmission, the knowledge of LTE transmission may not be available at the time when the NR transmission power is decided. One approach can be to split transmission power semi-statically between NR and LTE to respect the maximum transmission power limit. In this approach, LTE transmission power may be reduced even though there is no concurrent NR transmission and NR transmission power may be reduced even though there is no concurrent LTE transmission.

According to at least some embodiments, dynamic power sharing can be done between NR and LTE when sTTI-based SPS is configured. In LTE-Rel15, the TPC in DCI format 3/3A can be considered in the power control of sPUCCH corresponding to SPS-sPDSCH/SPS-sPUSCH in SPS operation. The power control loop for SPS may not be impacted by the UL/DL sDCI. The power control loop for non-SPS may not be impacted by DCI format 3/3A. Also, in LTE-Rel15, retransmission of a packet that has been sent initially via SPS is scheduled via a dynamic UL grant. For LTE-URLLC, one option can be to use UL-SPS with repetitions in multiple consecutive sTTIs. For LTE-URLLC service with 1 ms target latency, HARQ-based retransmissions may not meet the latency target. Therefore, the eNB may not schedule a re-transmission of a Transport Block (TB).

If the UE is configured with SPS configuration corresponding to sTTI in an LTE Primary cell (Pcell), the NR modem can know the SPS occasions and also the transmit power corresponding to the LTE-sTTI SPS transmissions as it can be determined by DCI format 3/3A with legacy n+4 subframe timing, such as four 1 ms-subframes after reception of DCI format 3/3A. In such a scenario, dynamic power sharing between NR and LTE transmissions can be possible, such as using the same/similar way as currently supported for legacy 1 ms-LTE with n+4 subframe timing. At least some of the following embodiments can provide such a dynamic power sharing. Also, at least some of the embodiments can provide the dynamic power sharing for an FDD LTE cell.

According to a possible embodiment, if the UE is configured with UL-SPS transmissions corresponding to LTE-URLLC, if the UE does not expect HARQ retransmissions corresponding to a transport block, if the UE has the capability of and/or is configured with dynamic power sharing between NR and LTE, if the UE transmission(s) in subframe/slot/subslot $i_1$ of the MCG, such as a LTE cell, overlap in time with UE transmission(s) in slot $i_2$ of the SCG, such as a NR cell, and if $\hat{P}_{MCG}(i_1)+\hat{P}_{SCG}(i_2)>\hat{P}_{Total}^{EN-DC}$ in a portion of slot $i_2$ of the SCG, then the UE can reduce transmission power in the, or in any, portion of slot $i_2$ of the SCG so that $\hat{P}_{MCG}(i_1)+\hat{P}_{SCG}(i_2)\leq\hat{P}_{Total}^{EN-DC}$ in any portion of slot $i_2$. $\hat{P}_{MCG}(i_1)$ and $\hat{P}_{SCG}(i_2)$ can be the linear values of the total UE transmission powers in subframe/slot/subslot $i_1$ of the MCG and in slot $i_2$ of the SCG, respectively. The subframe/slot/subslot can be a TTI corresponding to LTE transmissions. The UE may not expect HARQ retransmissions corresponding to a transport block by receiving higher layer signaling that indicates whether the UE should not expect HARQ retransmissions of a TB, such as a TB associated with LTE-URLLC transmissions.

According to another possible embodiment, for the first SPS occasion after SPS is (re)activated via SPS activation DCI, the initial transmission power can be determined based on the (re)activation DCI and can be updated based on DCI format 3/3A. Based on the processing timeline of DCI (re)activating the sTTI-based-SPS and also the sTTI-SPS periodicity, the transmission power of the first few sTTI-based-SPS occasions may not be known in time for the purpose of dynamic power sharing between NR and LTE. In such a case, dynamic power sharing can be applicable after a specified/configured time duration. The time duration can be determined based on NR processing timeline and LTE processing timeline. It is also possible to have TPC in SPS activation/release used for validation and the UE can derive the transit power based on the most recent TPC for sTTI operation. In this case, dynamic power sharing can be avoided for the first few sTTIs as described above. It is also possible to have TPC in SPS activation/release used for validation and the UE can use 0 dB for TPC. In this case, there can be no need to avoid dynamic power sharing for the first few sTTIs.

According to another possible embodiment, if uplink skipping is used, such as no TB constructed from padding bits when no UL data is available at the UE, for the purpose of dynamic power sharing, the UE can assume LTE transmissions will occur in the sTTI-based-SPS occasions. However, if many UL sTTI-SPS occasions are skipped, then NR transmission power may be reduced when no LTE-sTTI-SPS transmissions occur, which can affect the NR performance. At least some of the following implementations can remedy this situation. These implementations may also be applicable to the case of 1 ms-legacy LTE with UL skipping if the NR power determination is done earlier than the time the LTE modem starts PUSCH preparation for transmission in an SPS occasion when UL skipping option has been enabled/configured.

Figure 3:
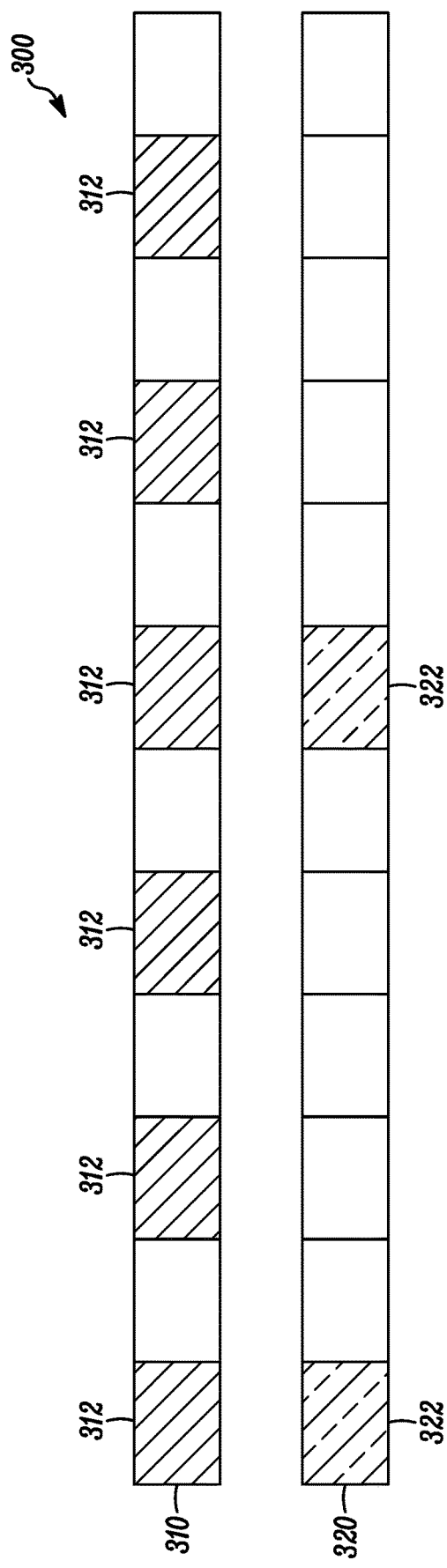
FIG. 3 is an example illustration of two SPS configurations for SPS occasions according to a possible embodiment.

FIG. 3 is an example illustration 300 of two SPS configurations 310 and 320 for SPS occasions according to a possible embodiment. According to a possible implementation for UL skipping corresponding to this embodiment, the UE can determine if dynamic power sharing should be used at SPS occasions based on one or more of the following factors: SPS periodicity, NR and/or LTE processing timeline(s), a higher layer parameter, referred to here as dynamicpowersharing-SPS, enabling/disabling dynamic power sharing for LTE-SPS operation, such as for LTE-URLLC, and other factors for dynamic power sharing.

For example, for SPS periodicities shorter than W sTTIs or TTIs, such as when SPS occasions are quite frequent, the UE may not perform dynamic power sharing for such SPS operation. The illustration 300 shows the top SPS configuration 310 with W=4, which has more frequent SPS occasions 312 than the SPS occasions 322 in the bottom configuration 320. In this case, dynamic power sharing may not be applicable for the top SPS configuration 310 with W=4, but may be applicable for the bottom SPS configuration 320. In such a case, a semi-static power split can be used, or a P_LTE2, and P_NR2 can be defined such that P_LTE2+P_NR2<=maximum allowed transmission power, or the UE may not expect to be configured with P_LTE+P_NR>maximum allowed transmission power. The parameter W can be specified/configured/determined based on NR and/or LTE processing timelines, such as the time the LTE modem starts PUSCH preparation for transmission in an SPS occasion when UL skipping option has been enabled/configured.

The parameter dynamicpowersharing-SPS can be a part of a SPS configuration, and the UE can apply dynamic power sharing corresponding to SPS occasions only if this parameter is set to enable the dynamic power sharing. According to another possible implementation, A base station, such as a gNB or eNB, may enable/disable dynamic power sharing based on one or more of number of skipped SPS/UL occasions and SPS transmission power. A base station can enable/disable dynamic power sharing via physical layer signaling. For example, a gNB/eNB can send a DCI to the UE indicating that dynamic power sharing is disabled until reception of another DCI enabling dynamic power sharing again. Once dynamic power sharing is disabled, a default, such as configured, semi-static power split can be applied. Alternately, the DCI can indicate a temporarily semi-static power-split, such as by using P_LTE2 and P_NR2 values such that P_LTE2+P_NR2<=maximum allowed transmission power. This approach can have less latency compared to higher layer signaling as UL skipping is kind of dynamic especially for SPS configurations with short SPS periodicity, such as SPS occasions close to each other. An eNB and/or gNB can enable/disable dynamic power sharing using a DCI or a similar approach as (re)activation-DCI for SPS with verification to increase the reliability of DCI, but for the NR carrier/cell. The DCI containing the TPC command for SPS may implicitly/explicitly enable/disable dynamic power sharing. For example, if the resulting transmit power for LTE-SPS, such as determined via DCI format 3/3A, is higher than a threshold, and there have been quite frequent skipped UL transmissions, the base station, such as a eNB and/or gNB, can disable dynamic power sharing temporarily. A base station can also enable/disable dynamic power sharing via higher layer signaling. According to another possible implementation, the UE can apply/stop dynamic power sharing based on number of skipped SPS UL occasions.

According to another possible embodiment, if the retransmissions corresponding to LTE-sTTI-based-SPS operation are scheduled via dynamic grants and if, based on the LTE-sTTI processing timeline and the sTTI-based-SPS configuration, such as SPS occasions, the retransmissions always occur in subframes not overlapping with sTTI-based-SPS transmissions, then the UE can apply dynamic power sharing in sTTIs/TTIs/subframes corresponding to SPS operation, and in subframes not overlapping with sTTI-based-SPS transmissions, dynamic power sharing may not be applied, such as if NR and/or LTE processing time line(s) do not allow dynamic power sharing between NR and LTE for dynamically scheduled LTE sTTI-based transmissions.

According to another possible embodiment, if there is any repetition of UL transmission for LTE, SPS or dynamic, or in an UL multi-TTI scheduling where a single UL grant schedules multiple UL TTIs for LTE, the UE can determine the power scaling of NR transmission in slot i2 based on a knowledge of LTE transmission in subframe/slot/subslot i1−m, where m>0. The value of m can be determined based on one or more of a repetition factor for LTE transmission, a number of scheduled UL TTIs in case of multi-TTI scheduling, a repetition factor for NR transmission, and/or other information. Such a scheme can be used if the processing timeline of LTE is faster than that of NR and a semi-static power split can be applied when dynamic power sharing is not possible. Knowing the transmission pattern of LTE in time and power domains can enable dynamic power sharing for an NR slot, such as when two consecutive NR slots overlap with multiple LTE-(s)TTI transmissions by SPS, repetition, or multi-TTI scheduling. In such a case, the NR modem can be able to scale NR transmission power for the second NR slot.

At least some embodiments can provide subframe-Assignment-r15, such as within tdm-PatternConfig-r15, and sTTI configuration. For a UE configured with EN-DC and serving cell frame structure type 1, if the UE is configured with subframe-Assignment-r15 for the serving cell, the UE may not be expected to transmit any uplink physical channel or signal in the serving cell on subframes other than offset-UL subframes, where the offset-UL subframes can be determined by applying an offset value given by harq-Offset-r15 to the subframes denoted as uplink in the UL/DL configuration subframe-Assignment-r15. This can mean a reference TDD UL/DL configuration can be configured for LTE transmissions where the LTE UL transmissions of a UE may only happen in the UL subframes determined by the UL/DL reference configuration.

In Rel15 LTE, it can be possible to configure a UE with 2/3OS DL sTTI and 2/3OS UL sTTI for FDD, 2/3OS DL sTTI and 7OS UL sTTI for FDD, and 7OS DL sTTI and 7OS UL sTTI for FDD and TDD. To simplify the processing timing, one or more of the following embodiments can be used. These embodiments can apply to an FDD LTE cell or other types of cell. According to a possible embodiment, if the UE is configured with subframe-Assignment-r15, the UE is not expected to receive a (s)DCI in an sTTI where at least a portion of its corresponding UL transmission, (s)PUCCH or (s)PUSCH, may not occur in one of the UL subframes defined by the reference TDD UL/DL subframe configuration and harq-offset-r15. According to another possible embodiment, if the UE is configured with subframe-Assignment-r15, the UE may not be expected to be configured with 2/3 OS DL sTTI. This can mean only {7OS (DL), 7OS (UL)} configuration may be possible when the UE is configured with subframe-Assignment-r15. According to another possible embodiment, if the UE is configured with 2/3 OS DL sTTI, the UE may not be expected to be configured with subframe-Assignment-r15. According to another possible embodiment, if the UE is configured with subframe-Assignment-r15, the UE may not be expected to be configured with 2/3 OS UL sTTI. If the UE is configured with 2/3 OS DL sTTI, the UL grant can be sent following the FDD UL grant timing for {2(DL),7(UL)} configuration. According to another possible embodiment, if the UE is configured with 2/3 OS UL sTTI, the UE may not be expected to be configured with subframe-Assignment-r15.

Figure 4:
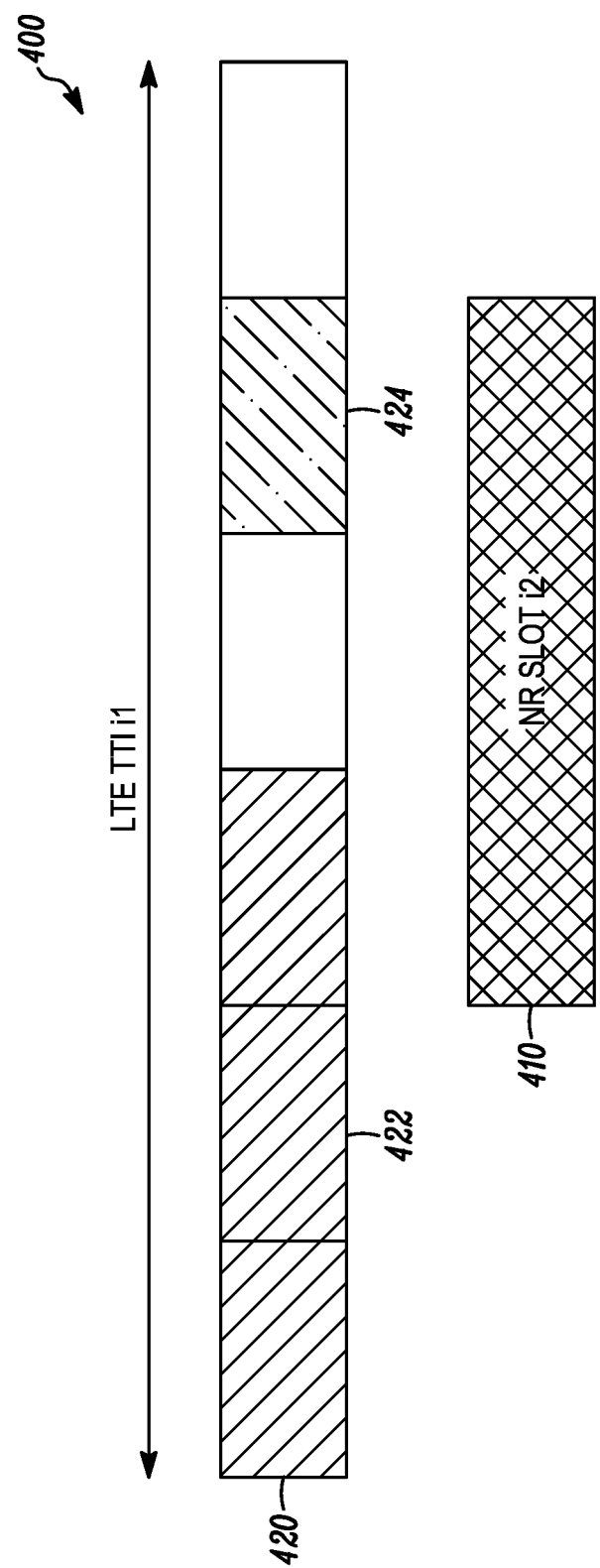
FIG. 4 is an example illustration of a NR slot overlapping with an LTE transmission according to a possible embodiment.

FIG. 4 is an example illustration 400 of a NR slot 410 overlapping with an LTE transmission 420 according to a possible embodiment. This embodiment and at least some other embodiments can provide for dynamic power sharing and TTI/sTTI UL collision in a subframe. If a 1 ms UL LTE transmission has collided with an sTTI UL LTE transmission in any portion of TTI i1 containing LTE UL transmissions, the 1 ms UL transmission can be stopped according to UE implementation according to agreements described herein. Here, if the NR slot i2 410 containing NR UL transmissions overlaps in time with a portion of TTI i1 420 where both 1 ms and sTTI-based transmissions are present, the NR transmission power can be scaled down considering the maximum of 1 ms and sTTI transmission power as shown in the illustration 400. For example, the NR slot i2 410 overlaps with the LTE transmission in TTI i1 420, where there is collision in TTI i1 between the 1 ms-based transmission 422 and the sTTI-based transmission 424. Accordingly, the 1 ms-based transmission can be stopped for only the portion of TTI i1 including the 1 ms-based transmission.

At least some embodiments can provide for EN-DC power sharing with NR as the anchor, such as with Architecture Option 4, which can be considered as NE-DC. According to a possible embodiment, when the UE is configured with an MCG using NR radio access and with an SCG using LTE radio access, such as Architecture Option 4, dynamic NE-DC power sharing may not be supported if the UE processing time for LTE is slower than that for NR. Also, dynamic NE-DC power sharing may be supported when NR is configured with at least one additional DMRS. Additionally, dynamic NE-DC power sharing can be supported when NR is only configured for transmission based on configured grant Type-1, such as a semi-statically configured transmission, like a grant-free transmission. Furthermore, dynamic NE-DC power sharing can be supported when NR is only configured for transmission based on configured grant Type-1, such as a semi-statically configured transmission, like a grant-free transmission, when no retransmissions are expected. Also, dynamic NE-DC power sharing can be supported when only NR URLLC transmissions are expected.

Figure 5:
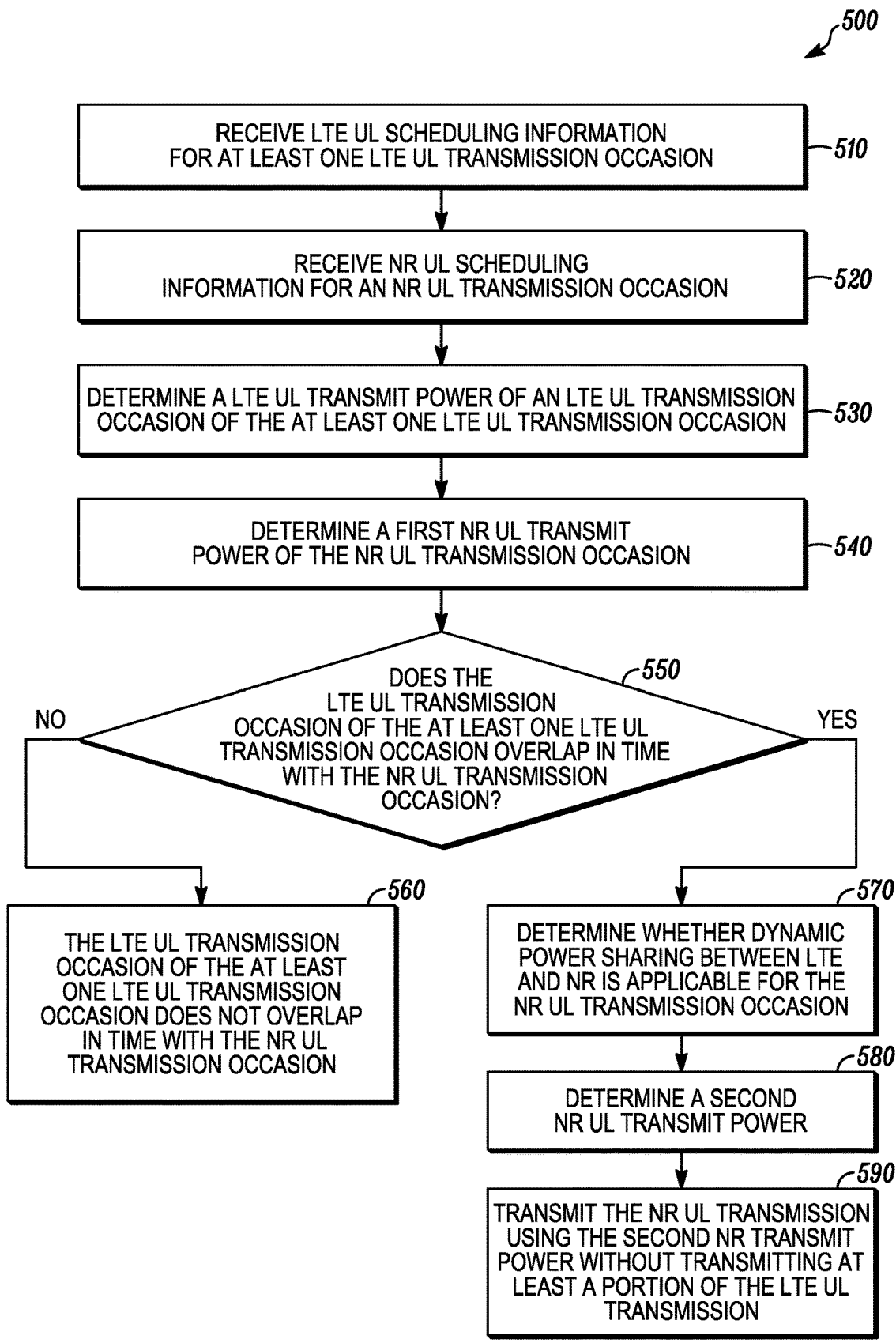
FIG. 5 is an example flowchart illustrating the operation of an apparatus according to a possible embodiment.

FIG. 5 is an example flowchart 500 illustrating the operation of a wireless communication device, such as the UE 110, according to a possible embodiment. At 510, LTE UL scheduling information for at least one LTE UL transmission occasion can be received. According to a possible embodiment, the LTE UL scheduling information can include higher layer signaling including a semi-static configuration, can include higher layer signaling, such as a semi-dynamic Medium Access Control-Control Element (MAC-CE), can include physical layer dynamic control information, can include other LTE UL scheduling information, and/or can include a combination thereof.

According to a possible embodiment, the at least one LTE UL transmission occasion can include a plurality of SPS LTE UL transmission occasions. For example, the plurality of SPS LTE UL transmission occasions can be the at least one SPS LTE UL transmission occasion. According to another possible embodiment, the LTE UL transmission occasion can have a duration shorter than a subframe and can have an associated short LTE processing time that is shorter than the processing time of a regular LTE processing time for UL transmissions. For example, the subframe can have a duration of 1 ms and the regular LTE processing time can be 4 ms. According to another possible embodiment, the LTE UL transmit power of the LTE UL transmission occasion can be determined based on a TPC command associated with the regular LTE processing time. According to another possible embodiment, the at least one LTE UL transmission occasion can be at least one dynamically scheduled LTE UL transmission occasion.

At 520, NR UL scheduling information for an NR UL transmission occasion can be received. According to a possible embodiment, the NR UL scheduling information can be from higher layer signaling, can be physical layer dynamic control information, and/or can be other signaling.

Higher layer signaling can include a semi-static configuration, a semi-dynamic MAC-CE, or any other higher layer signaling.

At 530, an LTE UL transmit power of an LTE UL transmission occasion of the at least one LTE UL transmission occasion can be determined. At 540, a first NR UL transmit power of the NR UL transmission occasion can be determined. The first NR transmit power of the NR UL transmission occasion can be determined based on the NR UL scheduling information. According to a possible embodiment, because LTE may be slower, the first NR UL transmit power can be determined after determining the LTE UL transmit power. According to other possible embodiments, the NR UL transmit power and the LTE UL transmit power can be determined in different orders.

At 550, a determination can be made as to whether the LTE UL transmission occasion of the at least one LTE UL transmission occasion overlaps in time with the NR UL transmission occasion. At 560, if the LTE UL transmission occasion of the at least one LTE UL transmission occasion overlaps in time with the NR UL transmission occasion, operations can be performed based on this result. According to a possible embodiment, the NR UL transmission can be transmitted using the first NR UL transmit power if at least one LTE UL transmission occasions of the at least one LTE UL transmission occasion overlaps with the NR UL transmission occasion. For example, the NR UL transmission can be transmitted using the first NR UL transmit power if none of the LTE UL transmission occasions of the at least one LTE UL transmission occasion do not overlap with the NR UL transmission occasion. According to another possible embodiment, the NR UL transmission can be transmitted using the first NR UL transmit power if none of LTE UL transmission occasions of the at least one LTE UL transmission occasion overlap with the NR UL transmission occasion.

At 570, if the LTE UL transmission occasion of the at least one LTE UL transmission occasion overlaps in time with the NR UL transmission occasion, a determination can be made as to whether dynamic power sharing between LTE and NR is applicable for the NR UL transmission occasion. According to different possible embodiments, determining whether dynamic power sharing between LTE and NR is applicable for the NR UL transmission occasion can be based on a SPS configuration, based on reception of a physical layer signal enabling or disabling dynamic power sharing, based on a received a downlink control channel indicator that indicates whether dynamic power sharing is applicable for the NR UL transmission occasion, based on a time distance between an LTE UL SPS transmission occasion of the at least one LTE UL transmission occasion and a latest LTE UL SPS activation or reactivation command, based on a number of skipped UL SPS occasions, based on transmit power of the LTE UL transmission occasion, based on an NR processing timeline, based on an LTE processing timeline, and/or based on other information. The SPS configuration can include a periodicity of the SPS and/or other information. The physical layer signal can be received on a control channel or otherwise received. The number of skipped UL SPS occasions can be a number of recent skipped UL SPS occasions or another number of skipped UL SPS occasions.

According to another possible embodiment, the at least one LTE UL transmission occasion can be SPS transmission occasions and determining whether dynamic power sharing between LTE and NR is applicable can include determining dynamic power sharing between LTE and NR is applicable for the NR UL transmission occasion if a periodicity of the SPS transmission occasions is larger than a threshold. For example, the periodicity of the SPS transmission occasions can be determined to be larger than a threshold by comparing the periodicity of the SPS transmission occasions to the threshold. According to another possible embodiment, determining whether dynamic power sharing between LTE and NR is applicable can include determining dynamic power sharing between LTE and NR is not applicable for the NR UL transmission occasion if the transmit power of the LTE UL transmission occasion is larger than a threshold. For example, the transmit power of the LTE UL transmission occasion can be determined to be larger than a threshold by comparing the transmit power of the LTE UL transmission occasion to the threshold. As a further example, if the resulting transmit power for LTE-SPS, such as determined via DCI format 3/3A, is higher than a threshold, and there have been quite frequent skipped UL transmissions, then a base station can disable dynamic power sharing temporarily.

According to another possible embodiment, a configured power split can be applied between the LTE UL transmission and the NR UL transmission if dynamic power sharing is determined not to be applicable for the NR UL transmission occasion. The configured power split can include a configured maximum power for LTE and a configured maximum power for NR. A sum of the configured maximum power for LTE and the configured maximum power for NR may not exceed the threshold. For example, the sum can be determined to be larger than a threshold by comparing the sum to the threshold.

At 580, a second NR UL transmit power can be determined based on there being an LTE UL transmission in the LTE UL transmission occasion, based on dynamic power sharing between LTE and NR being applicable for the NR UL transmission occasion, based on the LTE UL transmit power summed with the first NR UL transmit power being higher than a threshold, and/or based on other information. According to different possible embodiments, the threshold can be related to a UE maximum configured output power, a UE maximum configured output power for dual connectivity with LTE Radio Access Network (RAN) as an anchor, a maximum configured output power for power sharing for dual connectivity operation with NR RAN as an anchor, and/or any other threshold. For example, the UE maximum configured output power can be considered Pcmax and the maximum configured output power for power sharing for dual connectivity operation with LTE RAN as an anchor can be considered P_{EN-DC, Total}. The LTE RAN can also be considered a EUTRA RAN. The second NR UL transmit power can be determined such that the LTE UL transmit power summed with the second NR UL transmit power is not higher than the threshold.

According to a possible embodiment, determining the second NR UL transmit power based on there being an LTE UL transmission in the LTE UL transmission occasion can include determining the second NR UL transmit power assuming there is an LTE UL transmission in the LTE UL transmission occasion. For example, the second NR UL transmit power can be determined regardless of whether there is an actual LTE UL transmission in the LTE UL transmission occasion. According to another possible embodiment, determining a second NR UL transmit power can include scaling down the first NR UL transmit power until the scaled down LTE UL transmit power summed with the second NR UL transmit power is not higher than a threshold if dynamic power sharing between LTE and NR is applicable, even if the LTE UL transmission occasion is skipped. For example, the sum can be determined to be larger than a threshold by comparing the sum to the threshold.

According to another possible embodiment, determining the second NR UL transmit power can include scaling down the first NR UL transmit power in symbols of the LTE UL transmission occasion of the at least one LTE UL transmission occasion that overlap with the NR UL transmission occasion. For example, if the UE indicates a capability for dynamic power sharing and if the UE faces a power-limited situation in overlapping uplink transmissions to LTE and NR, then the UE can keep the power setting for the LTE and can scale down the power for NR or drop the NR transmission in the overlapping, power-limited portion. As a further example, determining the second NR UL transmit power can include scaling down the first NR UL transmit power until the LTE UL transmit power summed with the scaled down first NR UL transmit power is not higher than a threshold. Scaling down the first NR UL transmit power can include scaling based on a value of zero for NR UL transmit power, such as by dropping the NR UL transmission.

At 590, the NR UL transmission can be transmitted using the second NR transmit power without transmitting at least a portion of the LTE UL transmission. According to a possible embodiment, transmitting the NR UL transmission without transmitting at least a portion of the LTE UL transmission can include transmitting the NR UL transmission using the second NR transmit power while skipping the LTE UL transmission. According to another possible embodiment, transmitting the NR UL transmission using the second NR transmit power while skipping the LTE UL transmission can also include transmitting the NR UL transmission using the second NR transmit power without transmitting the LTE UL transmission. According to another possible embodiment, transmitting the NR UL transmission using the second NR transmit power without transmitting at least a portion of the LTE UL transmission can include dropping NR UL transmission in symbols of the LTE UL transmission occasion of the at least one LTE UL transmission occasion that overlap with the NR UL transmission occasion.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
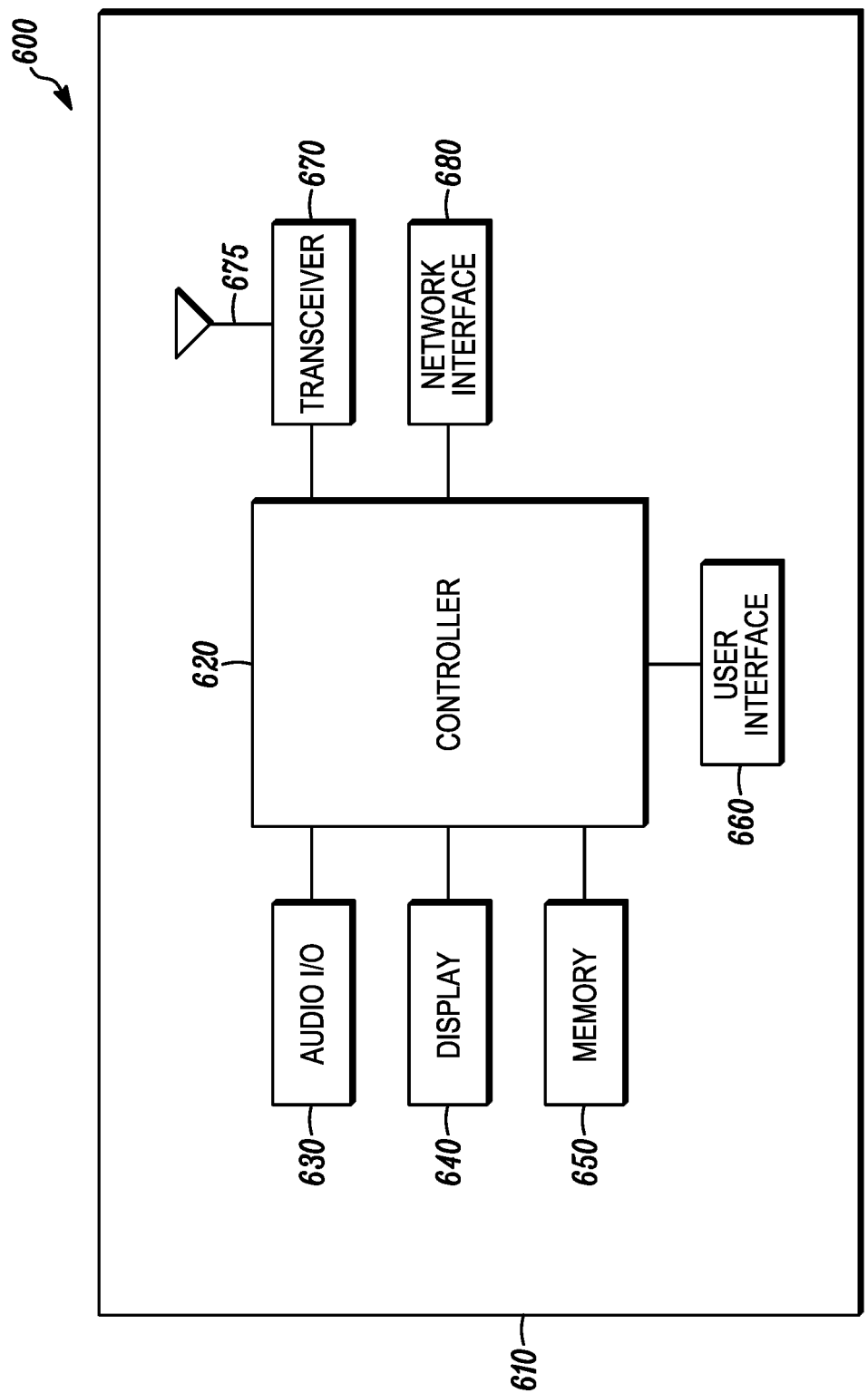
FIG. 6 is an example block diagram of an apparatus according to a possible embodiment.

FIG. 6 is an example block diagram of an apparatus 600, such as the UE 110, the network entity 120, or any other device disclosed herein, according to a possible embodiment. The apparatus 600 can include a housing 610, a controller 620 coupled to the housing 610, audio input and output circuitry 630 coupled to the controller 620, a display 640 coupled to the controller 620, a memory 650 coupled to the controller 620, a user interface 660 coupled to the controller 620, a transceiver 670 coupled to the controller 620, at least one antenna 675 coupled to the transceiver 670, and a network interface 680 coupled to the controller 620. The apparatus 600 may not necessarily include all of the illustrated elements for different embodiments of the present disclosure. The apparatus 600 can perform the methods described in all the embodiments.

The display 640 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 670 can be one or more transceivers that can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive communication signals. The memory 650 can include a Random-Access Memory (RAM), a Read Only Memory (RON), an optical memory, a solid-state memory, a flash memory, a removable memory, a hard drive, a cache, or any other memory that can be coupled to an apparatus.

The apparatus 600 or the controller 620 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 650 or elsewhere on the apparatus 600. The apparatus 600 or the controller 620 may also use hardware to implement disclosed operations. For example, the controller 620 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

In operation, the apparatus 600 can perform the methods and operations of the disclosed embodiments. The transceiver 670 can transmit and receive signals, including control signals and data signals and including information, such as control and data information. The controller 620 can generate and process the transmitted and received signals and information.

According to a possible embodiment, the transceiver 670 can receive LTE UL scheduling information for at least one LTE UL transmission occasion. The transceiver 670 can receive NR UL scheduling information for an NR UL transmission occasion. The controller 620 can determine an LTE UL transmit power of an LTE UL transmission occasion of the at least one LTE UL transmission occasion. The controller 620 can determine a first NR UL transmit power of the NR UL transmission occasion. The controller 620 can determine whether the LTE UL transmission occasion of the at least one LTE UL transmission occasion overlaps in time with the NR UL transmission occasion.

If the LTE UL transmission occasion of the at least one LTE UL transmission occasion overlaps in time with the NR UL transmission occasion, the controller 620 can determine whether dynamic power sharing between LTE and NR is applicable for the NR UL transmission occasion and can determine a second NR UL transmit power based on there being an LTE UL transmission in the LTE UL transmission occasion, based on dynamic power sharing between LTE and NR being applicable for the NR UL transmission occasion, based on the LTE UL transmit power summed with the first NR UL transmit power being higher than a threshold, and/or based on other information. The second NR UL transmit power can be determined such that the LTE UL transmit power summed with the second NR UL transmit power is not higher than the threshold. The transceiver 670 can transmit the NR UL transmission using the second NR transmit power without transmitting at least a portion of the LTE UL transmission.

Additional supporting information is included below. This information is optional with respect to the above embodiments. For example, possible rules for operation of the devices disclosed herein can include the following rules, where the rules may or may not be applicable to different embodiments.

According to a NR power control rule from TS 38.213, if a UE is configured with $\hat{P}_{LTE}+\hat{P}_{NR}<\hat{P}_{Total}^{NE-DC}$, the UE determines a transmission power on the SCG as follows: If the UE is configured with reference TDD configuration for EUTRA (by higher layer parameter SUO-case1 in [13, TS 36.213]), and if the UE is configured for operation with shortened TTI and processing time on the MCG [13, TS 36.213], and if the UE transmission(s) in subframe $i_1$ of the MCG overlap in time with UE transmission(s) in slot $i_2$ of the SCG, and if $\hat{P}_{MCG}(i_1)+\hat{P}_{SCG}(i_2)>\hat{P}_{Total}^{EN-DC}$ in any portion of slot $i_2$ of the SCG, then the UE reduces transmission power in any portion of slot $i_2$ of the SCG so that $\hat{P}_{MCG}(i_1)+\hat{P}_{SCG}(i_2) \leq \hat{P}_{Total}^{EN-DC}$ in any portion of slot $i_2$, where $\hat{P}_{MCG}(i_1)$ and $\hat{P}_{SCG}(i_2)$ are the linear values of the total UE transmission powers in subframe $i_1$ of the MCG and in slot $i_2$ of the SCG, respectively.

According to a SPS power control rule, for sTTI-based SPS operation, DCI format 3/3A controls the transmission power and this DCI format is applicable to accumulative mode only. The following 3GPP agreements are relevant: The TPC-index for DCI format 3/3A is separately configured by RRC as part of the SPS configuration (i.e. TPC-PDCCH-config IE) for sTTI and TTI. If a UE is (re)configured with sTTI operation for a serving cell, the initial value of fc(*) for a serving cell c is determined as zero, and the UE shall reset accumulation, regardless of whether P_0_UE_PUSCH,c is changed or not.

In case of collision between sPUSCH and sPUCCH in the same sTTI on a given carrier for a UE, the UE transmits both sPUSCH and sPUCCH if the UE is indicating the capability of and is configured with simultaneous transmission of sPUSCH and sPUCCH. Otherwise, the UE transmits only sPUSCH including UCI of sPUCCH. FFS whether some priority rule applies for inclusion of UCI from sPUCCH.

When HARQ-ACK for PDSCH is transmitted on sPUSCH due to collision between PUSCH and sPUSCH or between PUCCH and sPUSCH in the same subframe on a given carrier, joint coding of HARQ-ACK for PDSCH and sHARQ-ACK for sPDSCH is supported. The feedback on sPUSCH consists of the concatenation of sHARQ-ACK (from one with the lowest cell index) prior to HARQ-ACK (from one with the lowest cell index).

Simultaneous transmission of TTI and sTTI UL channels is not allowed within the same carrier on overlapped symbols for PUSCH and sPUSCH, PUCCH and sPUCCH, PUSCH and sPUSCH, PUCCH and sPUSCH.

If a UE is not configured with simultaneous transmission of PUSCH and PUCCH, and if more than two of three UL channels are collided within the same subframe on a given carrier, collision handling between two UL channels of same TTI length is first applied, followed by collision handling of two UL channels of different TTI length.

In case a UE is not capable of simultaneous transmission of different TTI lengths across different carriers for a given band combination, and if UL channels with different TTI lengths are collided across different carriers for the band combination, all of the longer TTI channel(s) (including also PRACH) for the band combinations(are) dropped/stopped.

In case of collision of 1 ms TTI and multiple sTTIs of potentially different channel types within the same subframe on the same carrier (e.g., primary cell of a PUCCH group), and if sTTI is carrying 1 ms HARQ-ACK, HARQ-ACK of 1 ms TTI is carried on the first sTTI of those colliding sTTIs Regarding UE behaviour in case simultaneous transmission of different TTI lengths across different carriers is allowed/supported but when the UE is power-limited, TTI channel(s) with lower priority (e.g., longer TTI) is/are dropped/stopped until the condition that the UE becomes non-power-limited is met. Also, the following UE behaviors are defined:

As long as there are transmissions with different TTI lengths and the UE is power-limited, transmissions with longer TTI lengths are dropped/stopped, based on the following priority rules: sPUSCH with HARQ-ACK of P1/sPUCCH of P1>sPUSCH with HARQ-ACK of P2/sPUCCH of P2>PUSCH with HARQ-ACK of P1/PUCCH of P1>PUSCH with HARQ-ACK of P2/PUCCH of P2>sPUSCH without HARQ-ACK with DMRS of P1>sPUSCH without HARQ-ACK with DMRS of P2>sPUSCH without HARQ-ACK without DMRS of P1>sPUSCH without HARQ-ACK of P2>PUSCH without HARQ-ACK of P1>PUSCH without HARQ-ACK of P2> For subslot/slot/subframe PUSCH: Lower cell index>higher cell index.

P1=primary PUCCH group, P2=secondary PUCCH group, if present. HARQ-ACK of the dropped/stopped channel is transmitted on the channel (to be transmitted without dropping/stopping) with the highest priority. CSI of the dropped/stopped channel is dropped. After the dropping/stopping, if there is only a single TTI for transmission, and if the UE is still power limited, the power allocations in 36.213 are applied.

Regardless of whether or not a UE is capable of simultaneous transmission of different TTI lengths across different carriers, UCI of dropped/stopped channel is not allowed to be piggybacked onto channel of different PUCCH group, and will be dropped if there is no channel to be transmitted within the same PUCCH group containing the dropped/stopped channel.

In case of collision between PUSCH and sPUSCH in the same subframe on a given carrier for a UE: The UE shall transmit sPUSCH. The UE should attempt to drop/stop as soon as possible (up to UE implementation) the whole/remaining transmission of PUSCH without resuming the transmission. The UE shall not resume the dropped/stopped transmission. HARQ-ACK of PUSCH is transmitted on sPUSCH with spatial bundling for HARQ-ACK of PUSCH before mapping onto sPUSCH is supported. For 7os sPUSCH spatial bundling is applied when configured, for 2/3os sPUSCH spatial bundling is always applied. No requirement on the time of dropping prior to sPUSCH transmission is adopted. CSI of PUSCH is dropped.

If a UE is configured with simultaneous transmission of PUSCH and PUCCH, and if PUSCH, PUCCH, and sPUSCH are collided within the same subframe on a given carrier, the UE should attempt to drop/stop as soon as possible (up to UE implementation) the whole/remaining transmission of PUSCH and PUCCH, and shall transmit sPUSCH. The UE shall not resume the dropped/stopped transmission. HARQ-ACK of PDSCH is transmitted on sPUSCH. CSI on PUSCH or PUCCH is dropped.

If a UE is configured with simultaneous transmission of PUSCH and PUCCH, and if PUSCH is collided with sPUSCH and sPUCCH of the same sTTI within the same subframe on a given carrier, the UE should attempt to drop/stop as soon as possible (up to UE implementation) the whole/remaining transmission of PUSCH, and shall transmit sPUSCH and sPUCCH. The UE shall not resume the dropped/stopped transmission. HARQ-ACK of PDSCH is transmitted on sPUCCH. CSI on PUSCH is dropped If a UE is configured with simultaneous transmission of PUSCH and PUCCH, and if PUSCH and PUCCH are collided with sPUSCH and sPUCCH of the same sTTI within the same subframe on a given carrier, the UE should attempt to drop/stop as soon as possible (up to UE implementation) the whole/remaining transmission of PUSCH and PUCCH, and shall transmit sPUSCH and sPUCCH. The UE shall not resume the dropped/stopped transmission. HARQ-ACK of PDSCH is transmitted on sPUSCH. CSI on PUSCH or PUCCH is dropped.

In case sPUSCH is transmitted and in case dynamic codebook size is configured for 1 ms TTI, the HARQ-ACK bits for 1 ms TTI are determined based on 1 ms DAI in DCI.

UE behavior in case of sPUSCH transmission when simultaneous transmission of sPUCCH and sPUSCH is not configured and in case fixed codebook size is configured: PDSCH assignment detected and sPDSCH assignment not detected, and it is the first transmitted UL sTTI in the subframe, then no shortened TTI HARQ (sHARQ)-ACK bits on sPUSCH+all HARQ-ACK bits for 1 ms TTI on sPUSCH. PDSCH assignment detected and sPDSCH assignment detected, then include all HARQ-ACK bits for 1 ms TTI+sHARQ-ACK bits on sPUSCH. PDSCH assignment not detected and sPDSCH assignment detected, and it is the first transmitted UL sTTI in the subframe, then include all HARQ-ACK bits for 1 ms TTI+sHARQ-ACK bits on sPUSCH. PDSCH assignment not detected and sPDSCH assignment not detected, then no HARQ bits on sPUSCH.

In case of collision between PUSCH and sPUCCH in the same subframe on a given carrier, the UE should attempt to drop/stop as soon as possible (up to UE implementation) the whole/remaining transmission of PUSCH and shall transmit sPUCCH, and the UE shall not resume the dropped/stopped transmission. HARQ-ACK of PUSCH is transmitted on sPUCCH. Spatial bundling for HARQ-ACK of PUSCH before mapping onto 1-slot sPUCCH is supported when configured. Spatial bundling for HARQ-ACK of PUSCH before mapping onto 2/3-OS sPUCCH is applied. Joint coding of HARQ-ACK for PDSCH and sHARQ-ACK for sPDSCH is supported. CSI of PUSCH is dropped.

In case of collision between PUCCH format 2/4/5 and sPUCCH in the same subframe on a given carrier for a UE: The UE shall transmit sPUCCH. The UE should attempt to drop/stop as soon as possible (up to UE implementation) whole/remaining transmission of PUCCH format 2/4/5 without resuming the transmission. The UE shall not resume the dropped/stopped transmission.

In case of collision between PUCCH format 1/1a/1b/3 and sPUCCH in the same subframe on a given carrier for a UE: The UE shall transmit sPUCCH. The UE, should attempt drop/stop, as soon as possible (up to UE implementation) whole/remaining transmission of PUCCH format 1/1a/1b/3. The UE should strive to drop the PUCCH at a slot boundary before the start of the sPUCCH transmission. The UE shall not resume the dropped/stopped transmission.

In case of collision between PUCCH and sPUCCH in the same subframe on a given carrier, CSI of PUCCH is dropped.

In case of collision between PUCCH and sPUCCH in the same subframe on a given carrier for a UE: HARQ-ACK of PUCCH is transmitted on 1-slot sPUCCH; spatial bundling of HARQ-ACK of PUCCH is applied when configured; and no new higher layer signaling for spatial bundling is added. Existing signaling is re-used for the collision case. HARQ-ACK of PUCCH is transmitted on 2/3-os sPUCCH; and Spatial bundling of HARQ-ACK of PUCCH is always applied. Joint coding of HARQ-ACK for PDSCH and sHARQ-ACK for sPDSCH is supported; and the feedback on sPUCCH consists of the concatenation of sHARQ-ACK (from one with the lowest cell index) prior to HARQ-ACK (from one with the lowest cell index).

When HARQ-ACK for PDSCH is transmitted on sPUCCH due to collision between PUCCH and sPUCCH in the same subframe on a given carrier, HARQ and sHARQ bits are determined independently.

In case sPUCCH is transmitted, the HARQ-ACK bits for 1 ms TTI are determined based on 1 ms DAI in DCI in case dynamic codebook size is configured for 1 ms TTI.

In case sPUCCH is transmitted (regardless of whether or not there is a collision with 1 ms), all HARQ-ACK bits for 1 ms TTI from the configured carriers are always included in case fixed codebook size (including also single carrier case) is configured for 1 ms TTI. This translates to the following behavior: PDSCH assignment detected and sPDSCH assignment not detected, then DTX on sPUCCH+ all HARQ-ACK bits for 1 ms TTI on PUCCH. PDSCH assignment detected and sPDSCH assignment detected, then include all HARQ-ACK bits for 1 ms TTI+sHARQ-ACK bits on sPUCCH. PDSCH assignment not detected and sPDSCH assignment detected, then include all HARQ-ACK bits for 1 ms TTI+sHARQ-ACK bits on sPUCCH. PDSCH assignment not detected and sPDSCH assignment not detected, then DTX on sPUCCH and DTX on PUCCH.

In case of collision between PUCCH and sPUCCH in the same subframe on a given carrier for a UE, The PUCCH is not transmitted (including the SR that was prepared to be transmitted as part of the PUCCH). If sPUCCH contains valid SR resources, SR that was prepared as part of the PUCCH transmission is transmitted on the sPUCCH.

If a UE is configured with simultaneous transmission of PUSCH and PUCCH, and if PUSCH, PUCCH, and sPUCCH are collided within the same subframe on a given carrier, the UE should attempt to drop/stop as soon as possible (up to UE implementation) the whole/remaining transmission of PUSCH and PUCCH, and shall transmit sPUCCH. The UE shall not resume the dropped/stopped transmission. HARQ-ACK of PDSCH is transmitted on sPUCCH. CSI on PUSCH or PUCCH is dropped.

In case of collision between PUCCH format 2/4/5 and sPUSCH in the same subframe on a given carrier for a UE: The UE shall transmit sPUSCH. The UE should attempt to drop/stop as soon as possible (up to UE implementation) whole/remaining transmission of PUCCH format 2/4/5. The UE shall not resume the dropped/stopped transmission In case of collision between PUCCH format 1/1a/1b/3 and sPUSCH in the same subframe on a given carrier for a UE: The UE shall transmit sPUSCH. The UE, should attempt drop/stop, as soon as possible (up to UE implementation) whole/remaining transmission of PUCCH format 1/1a/1b/3. The UE should strive to drop the PUCCH at a slot boundary before the start of the sPUSCH transmission. The UE shall not resume the dropped/stopped transmission In case of collision between PUCCH and sPUSCH in the same subframe on a given carrier for a UE: HARQ-ACK of PUCCH is transmitted on sPUSCH. Spatial bundling for HARQ-ACK of PUCCH before mapping onto sPUSCH is supported. For 7os sPUSCH spatial bundling is applied when configured, for 2/3os sPUSCH spatial bundling is always applied. FFS other bundling. CSI of PUCCH is dropped If a UE is configured with simultaneous transmission of PUSCH and PUCCH, and if PUCCH is collided with sPUSCH and sPUCCH of the same sTTI within the same subframe on a given carrier, the UE should attempt to drop/stop as soon as possible (up to UE implementation) the whole/remaining transmission of PUCCH, and shall transmit sPUSCH and sPUCCH. The UE shall not resume the dropped/stopped transmission. HARQ-ACK of PDSCH is transmitted on sPUCCH. CSI on PUCCH is dropped.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve the operation of the disclosed devices based on the methods and structures described above. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a user equipment, the method comprising:
    receiving long-term evolution uplink scheduling information for at least one long-term evolution uplink transmission occasion;
    receiving new radio uplink scheduling information for a new radio uplink transmission occasion;
    determining a long-term evolution uplink transmit power of a long-term evolution uplink transmission occasion of the at least one long-term evolution uplink transmission occasion;
    determining a first new radio uplink transmit power of the new radio uplink transmission occasion;
    determining whether the long-term evolution uplink transmission occasion of the at least one long-term evolution uplink transmission occasion overlaps in time with the new radio uplink transmission occasion;
    if the long-term evolution uplink transmission occasion of the at least one long-term evolution uplink transmission occasion overlaps in time with the new radio uplink transmission occasion:
        determining whether dynamic power sharing between long-term evolution and new radio is applicable for the new radio uplink transmission occasion; and
        determining a second new radio uplink transmit power
            based on there being a long-term evolution uplink transmission in the long-term evolution uplink transmission occasion,
            based on dynamic power sharing between long-term evolution and new radio being applicable for the new radio uplink transmission occasion, and
            based on the long-term evolution uplink transmit power summed with the first new radio uplink transmit power being higher than a threshold,
            where the second new radio uplink transmit power is determined such that the long-term evolution uplink transmit power summed with the second new radio uplink transmit power is not higher than the threshold; and
        transmitting the new radio uplink transmission using the second new radio transmit power without transmitting at least a portion of the long-term evolution uplink transmission.

2. The method according to claim 1, wherein transmitting the new radio uplink transmission without transmitting at least a portion of the long-term evolution uplink transmission comprises transmitting the new radio uplink transmission using the second new radio transmit power while skipping the long-term evolution uplink transmission.

3. The method according to claim 2, wherein transmitting the new radio uplink transmission using the second new radio transmit power while skipping the long-term evolution uplink transmission comprises transmitting the new radio uplink transmission using the second new radio transmit power without transmitting the long-term evolution uplink transmission.

4. The method according to claim 1, wherein the at least one long-term evolution uplink transmission occasion comprises a plurality of semi-persistent scheduling long-term evolution uplink transmission occasions.

5. The method according to claim 4, wherein the long-term evolution uplink transmission occasion has a duration shorter than a subframe and has an associated short long-term evolution processing time that is shorter than the processing time of a regular long-term evolution processing time for uplink transmissions.

6. The method according to claim 5, wherein the long-term evolution uplink transmit power of the long-term evolution uplink transmission occasion is determined based on a transmit power control command associated with the regular long-term evolution processing time.

7. The method according to claim 1, further comprising transmitting the new radio uplink transmission using the first new radio uplink transmit power if at least one long-term evolution uplink transmission occasions of the at least one long-term evolution uplink transmission occasion overlaps with the new radio uplink transmission occasion.

8. The method according to claim 1, further comprising transmitting the new radio uplink transmission using the first new radio uplink transmit power if none of long-term evolution uplink transmission occasions of the at least one long-term evolution uplink transmission occasion overlap with the new radio uplink transmission occasion.

9. The method according to claim 1, wherein determining the second new radio uplink transmit power based on there being a long-term evolution uplink transmission in the long-term evolution uplink transmission occasion comprises determining the second new radio uplink transmit power assuming there is a long-term evolution uplink transmission in the long-term evolution uplink transmission occasion.

10. The method according to claim 1, wherein determining whether dynamic power sharing between long-term evolution and new radio is applicable for the new radio uplink transmission occasion is based on at least one selected from
    a semi-persistent scheduling configuration,
    reception of a physical layer signal enabling or disabling dynamic power sharing,
    a received a downlink control channel indicator that indicates whether dynamic power sharing is applicable for the new radio uplink transmission occasion,
    a time distance between a long-term evolution uplink semi-persistent scheduling transmission occasion of the at least one long-term evolution uplink transmission occasion and a latest long-term evolution uplink semi-persistent scheduling activation or reactivation command,
    a number of skipped uplink semi-persistent scheduling occasions,
    transmit power of the long-term evolution uplink transmission occasion,
    a new radio processing timeline, and
    a long-term evolution processing timeline.

11. The method according to claim 1,
    wherein the at least one long-term evolution uplink transmission occasion comprises semi-persistent scheduling transmission occasions, and
    wherein determining whether dynamic power sharing between long-term evolution and new radio is applicable comprises determining dynamic power sharing between long-term evolution and new radio is applicable for the new radio uplink transmission occasion if a periodicity of the semi-persistent scheduling transmission occasions is larger than a threshold.

12. The method according to claim 1, wherein determining whether dynamic power sharing between long-term evolution and new radio is applicable comprises determining dynamic power sharing between long-term evolution and new radio is not applicable for the new radio uplink transmission occasion if the transmit power of the long-term evolution uplink transmission occasion is larger than a threshold.

13. The method according to claim 1, wherein transmitting the new radio uplink transmission using the second new radio transmit power without transmitting at least a portion of the long-term evolution uplink transmission comprises dropping new radio uplink transmission in symbols of the long-term evolution uplink transmission occasion of the at least one long-term evolution uplink transmission occasion that overlap with the new radio uplink transmission occasion.

14. The method according to claim 1, wherein determining the second new radio uplink transmit power comprises scaling down the first new radio uplink transmit power in symbols of the long-term evolution uplink transmission occasion of the at least one long-term evolution uplink transmission occasion that overlap with the new radio uplink transmission occasion.

15. The method according to claim 1, further comprising applying a configured power split between the long-term evolution uplink transmission and the new radio uplink transmission if dynamic power sharing is determined not to be applicable for the new radio uplink transmission occasion, where the configured power split comprises a configured maximum power for long-term evolution and a configured maximum power for new radio, where a sum of the configured maximum power for long-term evolution and the configured maximum power for new radio does not exceed a threshold.

16. The method according to claim 1, wherein determining a second new radio uplink transmit power comprises scaling down the first new radio uplink transmit power until the scaled down long-term evolution uplink transmit power summed with the second new radio uplink transmit power is not higher than a threshold if dynamic power sharing between long-term evolution and new radio is applicable, even if the long-term evolution uplink transmission occasion is skipped.

17. The method according to claim 1, wherein the at least one long-term evolution uplink transmission occasion comprises at least one dynamically scheduled long-term evolution uplink transmission occasion.

18. The method according to claim 1, wherein the long-term evolution uplink scheduling information comprises at least one selected from higher layer signaling including a semi-static configuration, higher layer signaling including a semi-dynamic medium access control—control element, physical layer dynamic control information, and a combination thereof.

19. The method according to claim 1, wherein the threshold is related to at least one of
    a user equipment maximum configured output power,
    a user equipment maximum configured output power for dual connectivity with long-term evolution radio access network as an anchor, and a maximum configured output power for power sharing for dual connectivity operation with new radio radio access network as an anchor.

20. An apparatus comprising:
a transceiver that
receives long-term evolution uplink scheduling information for at least one long-term evolution uplink transmission occasion, and
receives new radio uplink scheduling information for a new radio uplink transmission occasion; and
a controller that
determines a long-term evolution uplink transmit power of a long-term evolution uplink transmission occasion of the at least one long-term evolution uplink transmission occasion,
determines a first new radio uplink transmit power of the new radio uplink transmission occasion, and
determines whether the long-term evolution uplink transmission occasion of the at least one long-term evolution uplink transmission occasion overlaps in time with the new radio uplink transmission occasion,
if the long-term evolution uplink transmission occasion of the at least one long-term evolution uplink transmission occasion overlaps in time with the new radio uplink transmission occasion, the controller
determines whether dynamic power sharing between long-term evolution and new radio is applicable for the new radio uplink transmission occasion, and
determines a second new radio uplink transmit power
based on there being a long-term evolution uplink transmission in the long-term evolution uplink transmission occasion,
based on dynamic power sharing between long-term evolution and new radio being applicable for the new radio uplink transmission occasion, and
based on the long-term evolution uplink transmit power summed with the first new radio uplink transmit power being higher than a threshold,
where the second new radio uplink transmit power is determined such that the long-term evolution uplink transmit power summed with the second new radio uplink transmit power is not higher than the threshold,
wherein the transceiver transmits the new radio uplink transmission using the second new radio transmit power without transmitting at least a portion of the long-term evolution uplink transmission.

* * * * *